Figure 1:
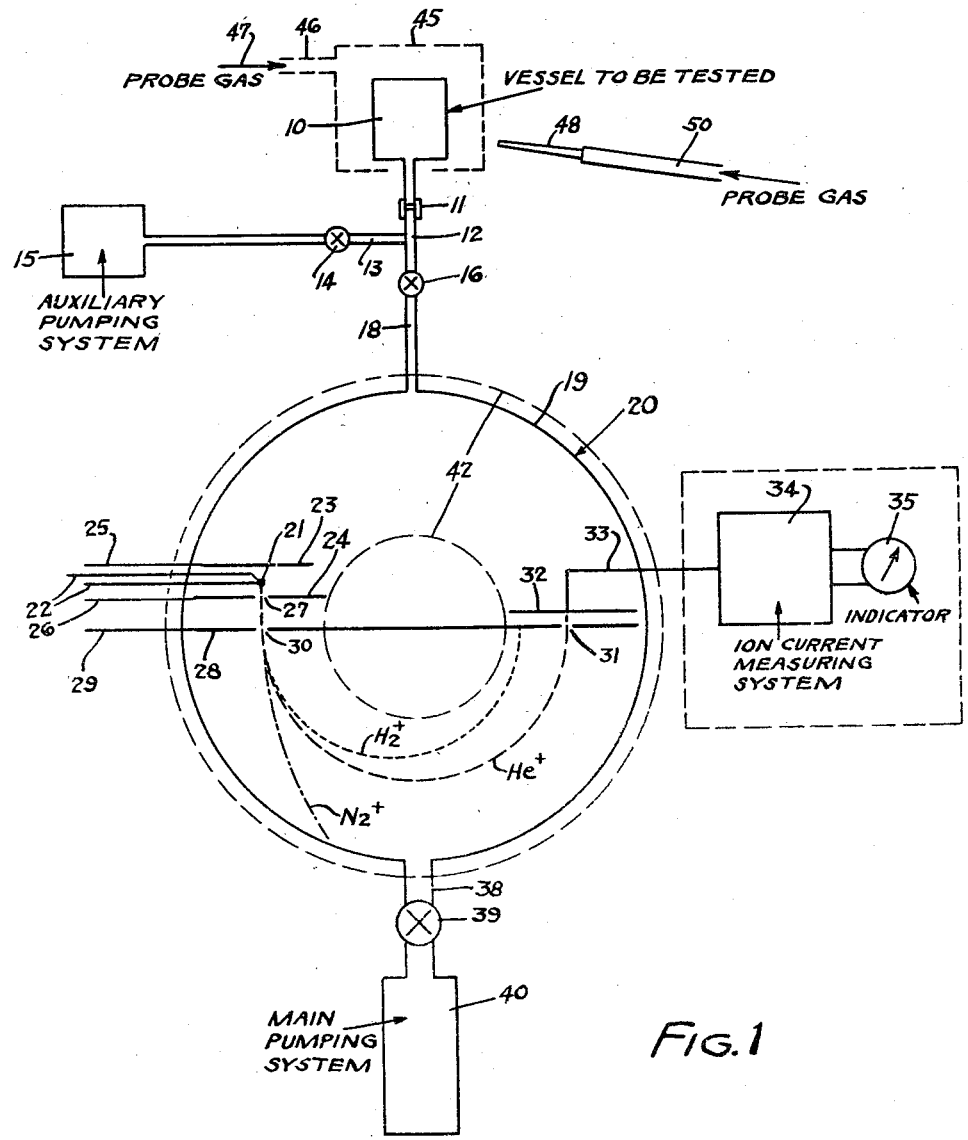

Patented Oct. 25, 1949

2,486,199

UNITED STATES PATENT OFFICE 2,486,199

METHOD AND APPARATUS FOR DETERMINING LEAKS

Alfred O. Nier, New York, N. Y., assignor to Regents of the University of Minnesota, Minneapolis, Minn., a corporation of Minnesota Application September 10, 1945, Serial No. 615,322

5 Claims. (Cl. 73—40)

1

This invention relates to method and apparatus for determining the tightness of vessels to vacuum or pressures. In the manufacture of containers which are evacuated or placed under pressure and particularly in the high vacuum industries, difficulty has frequently been encountered in determining whether or not the vessel so produced is sufficiently tight for its intended purpose. Thus, in the manufacturing of any high vacuum apparatus it is necessary in the laboratory or factory to determine the vacuum tightness. Probably the simplest method that has heretofore been employed is to fill the vessel under test with a gas at a pressure higher than atmosphere. The vessel is then immersed in water and the evolution of the bubbles observed. This method is subject to the difficulty that it requires the wetting of the entire apparatus and furthermore the stresses developed in the vessel by application of an internal pressure are different from those developed when the vessel is evacuated, and hence this method is not as readily applicable for the testing of vacuum type vessels as for the testing of pressure vessels.

In accordance with a second method of testing, the object being tested is evacuated and the evacuated system is then disconnected by closing a valve in the evacuation line. By means of a pressure gauge attached to the vessel the rate of pressure increase is measured. If this rate is sufficiently low to meet the tightness specifications the vessel is considered satisfactory. If not, a search for the leak must be made. This is a complex task, particularly if the vessel has many soldered or welded joints and it is done by the process of elimination.

In a third method which is particularly adaptable for laboratory procedures, the vessel undergoing testing is connected to a system having a high frequency coil adjacent to it and an electrical discharge is produced in that part of the system. Air has a characteristic pinkish color when subjected to a high frequency discharge, whereas for many substances the color is white, one of these substances, viz. carbon tetrachloride, can be sprayed with an atomizer at various parts of the vessel under test, and by observing the color of the discharge as the different parts of the vessel are operated, the source of the leak can sometimes be detected. This method has the disadvantage of not being particularly sensitive.

A fourth method of testing involves the continuous pumping of the vessel under test while the vessel has a pressure gauge of the thermocouple or Pirani type in the pump lead. Then,

2 by observing the pressure gauge as one paints over various parts of the vessel with a substance which will temporarily plug a hole, it is possible sometimes to determine the leaky places. This method is messy and is furthermore undesirable due to the fact that some of the material used for painting over the vessel will be drawn into the leak and it, or the residue of it, will remain in the leaky portion of the vessel wall. All of the foregoing methods are satisfactory in some cases but they are frequently lacking in sufficient sensitivity or are inapplicable for other reasons.

In accordance with the present invention there is provided an improved method of leak detection utilizing a mass spectrometer together with a probe gas.

It is an object of the present invention to provide an improved method and apparatus of leak detection and particularly to provide an improved method and apparatus utilizing a mass spectrometer and a probe gas.

Other and further objects of the invention are those inherent in the apparatus herein illustrated, described and claimed.

Figure 2:
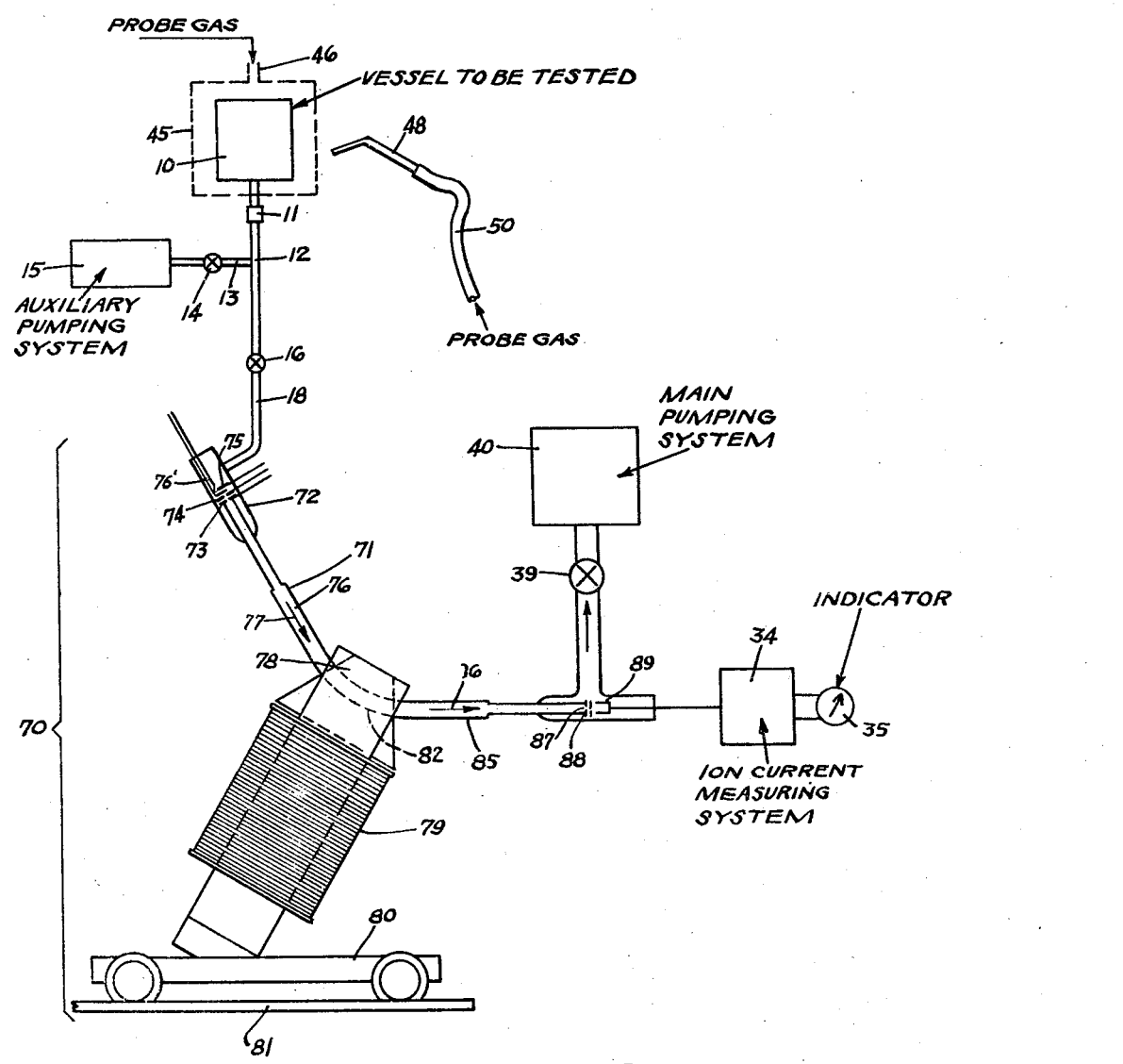

The invention is illustrated with reference to the drawings in which Figures 1 and 2 are schematic views of several types of apparatus of the invention which may be used in carrying out the method of the invention.

The invention comprehends both method and apparatus which is used in carrying out the method. Two illustrative types of apparatus are shown and described.

In carrying out the invention the vessel 10, Figure 1, undergoing testing is connected by means of coupling 11 to conduit 12 of a pumping system. Conduit 12 has a branch line 13 which communicates through valve 14 with an auxiliary pumping system 15. Conduit 12 is also provided with a valve 16 and a connection 18 to the envelope 19 of the mass spectrometer generally designated 20. The mass spectrometer may be of any suitable type. Two exemplary types are illustrated in Figure 1 or Figure 2. In the mass spectrometer of Figure 1 there is provided a filament heating system 21 which is suitably energized by lead wires 22. The filament 21 is situated between plates 23 and 24. Plate 24 is maintained at a negative potential with respect to plate 23, the potential being maintained by means of lead-in wires 25 and 26. The plate 24 is provided with a narrow slit 27. Below the plate 24 there is provided another plate 28 which is maintained at a much lower negative potential by means of lead-in wire 29. Plate 28 extends across evacuated envelope 19 in the particular type of mass spectrometer illustrated, and it is provided with a narrow slit or orifice 30 which is in line with the ion generator filament 21 and slit 27. Plate 28 is also provided with a second narrow slit or orifice 31 at the opposite side of the spectrometer tube. The two slits 27 and 30 are in line with each other. Above the slit 31 there is provided a target 32 which is connected by means of a lead-in wire 33 to an ion current measuring system utilizing a high gain amplifier 34 and an indicating instrument 35. The lower part of envelope 19 of the mass spectrometer is connected by an evacuating lead 38 which communicates through valve 39 to a main pumping station 40.

Above and below the plane of the spectrometer (which is the plane of the illustration) there are positioned annular electro-magnetic pole faces of the general outline indicated by the dotted lines 42, it being understood that one pole face is above the plane of the diagram and the opposite pole face below the plane of the diagram, Figure 1. The pole faces are connected in a magnetic circuit in which a magnetomotove force is provided by means of a permanent magnet or an electromagnet energized from a constant source of direct current. The resultant magnetic flux is perpendicular to the plane of the diagram sheet, Figure 1, and is confined by the pole faces to the area outlined at 42.

In operation the filament 21 is heated and the electrons thereby emitted bombard the gases within the envelope 19 and in so doing cause electrons to he split off the gaseous atoms, whereupon they become ions which are positively charged. The ions are consequently drawn toward negatively charged plate 24 by the potential gradient existing between plates 23 and 24. Those ions which hit upon the plate 24 are thereby dissipated but a certain fraction of the gas ions go through slit 27 and proceed as a beam of ions which are drawn towards plate 28 by the much lower negative potential at that plate. The positively charged ions hitting upon the plate 28 are stopped but some of them hit the slit 30 and proceed through the slit as a beam and into the space below the plate 28, whereupon they project outwardly along a curved path. The curvature of the path taken by a particular gas ion depends upon the mass of the ion, the strength of the magnetic field into which the ion is projected and the velocity at which it is moving. Thus, for a given velocity and field strength the radius of curvature of the path of a hydrogen ion is somewhat less than that of a helium ion due to the smaller mass of the hydrogen ion. Likewise the radius of curvature of the helium ion is somewhat less than the radius of curvature of the nitrogen ion. The paths are represented by the dotted lines $H_2^+$, $He^+$ and $N_2^+$. By suitably adjusting the strength of the electric field and the potential gradients between plates 23, 24 and 28, a particular type of ion may be caused to enter the aperture 31 and hence impinge upon the target 32 where it causes an electrical charge to be deposited which evidences itself as a current in lead 33. The current is communicated through the lead wire 33 to the amplifier 34 which provides an indication at 35.

In carrying out the method of the present invention the envelope and the mass spectrometer are preliminarily evacuated by means of the auxiliary pumping station which is then turned off by closing valve 14 and evacuation is continued by means of the main pumping station at 40, the valves 16 and 38 having meanwhile been opened. Evacuation is continued until stable conditions within the system are reached. It is assumed the mass spectrometer 20 has previously been adjusted so as to indicate the presence of ions of a gas not normally present in the envelope 19. A hood 45 is then placed around the vessel 10 being tested and a probe gas is introduced through the lead 46 as indicated by the arrow 47. As probe gases there may conveniently be used any gas not normally present in appreciable amounts in the system, such as helium, argon, krypton or any of the rare gases, or carbon dioxide which is normally not present in the atmosphere in appreciable quantities. Atmospheric gases could be used by noting the differences in reading, but it is preferred to use a rare gas, carbon dioxide or non-atmospheric gases. If the vessel 10 undergoing testing has a leak in it, the probe gas will enter through the leak and be drawn into the mass spectrometer 19 by means of the main pumping system 40. Upon entering the envelope 19 of the mass spectrometer the probe gas is ionized along with all other gases present. If, for example, it is assumed that helium is the probe gas, the atoms of helium entering the envelope 19 are ionized by bombardment with electrons in the region of the filament 21 and the positively charged helium ions thus produced are drawn toward plate 24 and emerge as a beam through slit 27, whereupon the electrons are accelerated and moved toward plate 28 and emerge as a beam through slit 30, whereupon they follow the curved path $He^+$ and enter the aperture 31 and impinge upon the plate 32, thus providing an indication at 35 which shows the operator that the probe gas has been drawn into the system. Ions of other types of gases do not follow the curve for which the spectrometer is adjusted and hence are caught on plate 28 around hole 31. The mass spectrometer is an exceedingly accurate instrument and almost immediately shows the entrance of the probe gas when a leak is present.

Having thus generally determined that a leak is present, the envelope 45 is removed and a blow pipe 48 having a very fine jet and connected through a rubber hose 50 to the probe gas supply system is moved by the operator over the surface of the vessel so that the probe gas is sprayed upon one little portion of the vessel 10 at a time, the reading on the indicator 35 being meanwhile noted. When the blow pipe 45 is brought into the region of the leak in the vessel, the probe gas is drawn through the leak and the indicator 35 thereby shows the presence of the probe gas in the system and hence the location of the leak.

Referring to Figure 2 there is illustrated a type of system utilizing a mass spectrometer of the type described in my publication "A Mass Spectrometer for Routine Isotope Abundance Measurements" published in The Review of Scientific Instruments, vol. 11, No. 7, 212–216, July 1940. In the system shown in Figure 2 the vessel 10 undergoing testing is connected through the coupling 11 as in Figure 1 to the pipe 12 which is connected through lead 13 and valve 14 to the auxiliary pumping system 15. Pipe 12 is likewise connected through the valve 16 and pipe 18 to one portion of the mass spectrometer generally indicated opposite the bracket 70. The evacuated envelope of the mass spectrometer is, in this instance, a curved tube 71 which is provided at its upper end with an enlarged glass terminal 72 having in it the plates 73, 74, 75 and the filament 76' which are energized as described in the aforesaid publication. As a result the gases in the region of the filament are ionized and are projected as a narrow beam by means of the potential gradients existing between plates 73, 74 and 75, the direction of movement of the beam being axially down the portion 76 of the tube. The beam of ionized gases moves straight down the tube in the direction of arrow 77 and into the magnetic field established by the pair of electromagnetically energized pole faces 78. In this instance the electromagnet, which is shown at 79, is mounted upon a small truck 80 which may be moved out of the way on track 81 so as to provide for de-gassing the portion 82 of the tube. The instrument is adjusted so that the direction of movement of the probe gas will be changed in the region of the pole faces so that the probe gas curves along the curved portion 82 of the tube and then continues straight down portion 85 of the tube in the direction of arrow 86 and enters through the orifice 87 in the plate 88 and impinges upon the target 89. Target 89 is connected as in Figure 1 to an ion current measuring system 34 of the type used in Figure 1, which includes the indicator 35. The main pumping station of Figure 2 is indicated at 40 and is controlled by means of the shut-off valve 39.

The only difference between this modification and Figure 1 is in the type of mass spectrometer used.

In this modification, as in Figure 1, the mass spectrometer is first adjusted to indicate the presence of a particular gas. The vessel 10 being tested is first enclosed in a suitable envelope 45 into which the particular gas, i. e. the probe gas is introduced through lead 46. Entrance of the probe gas into the evacuating system is noted by means of the indication provided by indicator 35. If the vessel indicates a leak then the hood 45 is removed and the blow pipe 48, which is likewise supplied with a probe gas, is held close to the surface of the vessel and is moved over the surface until the indicator 35 shows the presence of the probe gas in the evacuated system, thus indicating the location of the leak.

In certain cases it may be desirable to employ a liquid as a probe substance. It can be painted on the surface to be tested with a brush or directed onto the surface with a jet whence it enters through the leak and is gasified. By choosing a liquid having a sufficiently high vapor pressure, one can insure that evaporation takes place rapidly enough from the areas to which it is applied and thus permits one to probe various areas in succession.

Where using one of the common atmospheric gases as a probe gas reliance is placed upon the difference in the abundance of the particular gas (as indicated by instrument 35) when the normal atmospheric gas mixture is present and the abundance of such gas when it is applied in concentration by means of the envelope 45 or blow pipe. I prefer, however, to use a rare, not normally present gas as the probe gas so that when the probe gas is not being applied there will be little or no indication at 35. Thereafter, when any indication at all occurs it will evidence a leak.

As many apparently widely different embodiments of this invention may be made without departing from the spirit and scope thereof, it is to be understood that I do not limit myself to the specific embodiments herein except as defined by the appended claims.

What I claim is:
1. The method of determining the presence of leaks in enclosed vessels which comprises connecting the vessel to a mass spectrometer, adjusting the mass spectrometer to indicate the presence of a probe gas, evacuating the mass spectrometer and the vessel connected to it, reading the mass spectrometer indication, introducing said probe gas in the form of a gas or liquid and in concentration against said vessel and noting the presence of the probe gas in the indication of the mass spectrometer as an index of the leakage of the vessel.

2. The method of determining the presence of leaks in enclosed vessels which comprises connecting the vessel to a mass spectrometer, adjusting the mass spectrometer to indicate the presence of a probe gas not normally present in appreciable amounts in the residual gases within the mass spectrometer or in the atmosphere surrounding the vessel to be tested, evacuating the mass spectrometer and the vessel connected to it, enclosing the vessel undergoing testing in an envelope and introducing said probe gas into said envelope and again noting the presence of the probe gas in the mass spectrometer as indicated by the indicator thereof.

3. The method of claim 2 further characterized in that the probe material is selected from the group consisting of rare gases, carbon dioxide, argon and organic materials capable of gasification.

4. The method of claim 1 further characterized in that the probe substance is an evaporatable liquid which is applied to the surface to be tested by means of a spray gun, brush or other means.

5. The method of determining the presence of leaks in enclosed vessels which comprises connecting the vessel to a mass spectrometer, adjusting the mass spectrometer to indicate the presence of a probe gas not normally present in appreciable amounts in the residual gases within the mass spectrometer or in the atmosphere surrounding the vessel to be tested, evacuating the mass spectrometer and the vessel connected to it, enclosing the vessel undergoing testing in an envelope and introducing said probe gas into said envelope and again noting the presence of the probe gas in the mass spectrometer as indicated by the indicator thereof, then removing the envelope surrounding the vessel undergoing testing and applying a jet of probe gas successively over small areas of the vessel undergoing test until the position of the leak is shown by the mass spectrometer indicating the drawing in of the probe gas into the evacuated system.

ALFRED O. NIER.

REFERENCES CITED

The following references are of record in the file of this patent:

UNITED STATES PATENTS

| Number | Name | Date |
|---|---|---|
| 598,577 | Rowley | Feb. 8, 1898 |
| 1,307,813 | Fieldner | June 24, 1919 |
| 1,421,720 | Roberts | July 4, 1922 |
| 1,708,731 | McFarlane | Apr. 9, 1929 |
| 2,072,872 | Finkelstein | Mar. 9, 1937 |
| 2,255,921 | Fear | Sept. 16, 1941 |
| 2,387,786 | Washburn | Oct. 30, 1945 |